US012607444B2

(12) United States Patent
Lim et al.

(10) Patent No.: US 12,607,444 B2
(45) Date of Patent: Apr. 21, 2026

(54) APPARATUS AND METHODS FOR VERIFYING ALIGNMENT BETWEEN A SHADOW RING AND A SUBSTRATE

(71) Applicant: Applied Materials, Inc., Santa Clara, CA (US)

(72) Inventors: Sock Hoon Lim, Singapore (SG); Ramie Madeja, Singapore (SG); Wee Teng Fan, Singapore (SG)

(73) Assignee: Applied Materials Inc., Santa Clara, CA (US)

( * ) Notice: Subject to any disclaimer, the term of this patent is extended or adjusted under 35 U.S.C. 154(b) by 420 days.

(21) Appl. No.: 18/375,726

(22) Filed: Oct. 2, 2023

(65) Prior Publication Data

US 2025/0109931 A1      Apr. 3, 2025

(51) Int. Cl.
*G01B 5/14* (2006.01)
*B05C 21/00* (2006.01)
*B25J 9/16* (2006.01)

(52) U.S. Cl.
CPC .............. *G01B 5/14* (2013.01); *B05C 21/005* (2013.01); *B25J 9/1692* (2013.01)

(58) Field of Classification Search
CPC .................................. G01B 5/14; B25J 9/1692
USPC .......................................... 33/567, 613, 645
See application file for complete search history.

(56) References Cited

U.S. PATENT DOCUMENTS

| | | | | |
|---|---|---|---|---|
| 5,485,679 | A * | 1/1996 | Ternes ...................... | G03F 9/00 |
| | | | | 33/623 |
| 5,917,601 | A * | 6/1999 | Shimazaki ............. | G01D 5/342 |
| | | | | 356/400 |
| 5,929,529 | A * | 7/1999 | Takizawa ........... | G03F 7/70625 |
| | | | | 257/E23.179 |
| 6,220,080 | B1 * | 4/2001 | Fauque .................. | G01B 13/06 |
| | | | | 73/1.79 |
| 6,301,798 | B1 * | 10/2001 | Liu ...................... | G03F 7/70633 |
| | | | | 33/645 |
| 6,360,449 | B1 * | 3/2002 | Steentjes .............. | G01D 5/2457 |
| | | | | 33/1 PT |
| 6,568,098 | B1 * | 5/2003 | Beckhart ................. | H01L 21/68 |
| | | | | 33/645 |
| 7,089,677 | B2 * | 8/2006 | Lu ........................... | H01L 21/68 |
| | | | | 33/645 |
| 7,127,826 | B2 * | 10/2006 | Russell .................. | A61B 90/39 |
| | | | | 33/566 |
| 7,162,810 | B2 * | 1/2007 | Biggs .................... | B82Y 10/00 |
| | | | | 33/645 |
| 7,716,846 | B2 * | 5/2010 | Sanders ................ | F16C 35/062 |
| | | | | 33/645 |

(Continued)

FOREIGN PATENT DOCUMENTS

KR            20160144727 A      12/2016

*Primary Examiner* — George B Bennett
(74) *Attorney, Agent, or Firm* — Moser Taboada

(57) ABSTRACT

Methods and apparatus for verifying alignment between an opaque shadow ring and a substrate are provided. In some embodiments, the apparatus includes a tool comprising: a transparent ring having an inner edge defining a central opening and an outer edge and having a top side and a bottom side; a gauge mark on or in the transparent ring spaced between the inner edge and the outer edge, the gauge mark extending around the inner edge; and a pin extending from the bottom side of the transparent ring and located between the gauge mark and the outer edge.

20 Claims, 5 Drawing Sheets

(56)       References Cited

U.S. PATENT DOCUMENTS

| 11,823,937 | B2 * | 11/2023 | Bergantz | ........... | H01L 21/67259 |
| 2005/0198847 | A1 * | 9/2005 | Liu | .......................... | G01B 5/14 |
| | | | | | 33/533 |
| 2009/0182454 | A1 * | 7/2009 | Donoso | ................. | H01L 21/681 |
| | | | | | 700/254 |
| 2021/0291375 | A1 * | 9/2021 | Bergantz | ........... | H01L 21/67742 |
| 2022/0254666 | A1 | 8/2022 | Sadeghi et al. | | |
| 2025/0232997 | A1 * | 7/2025 | Thaulad | ............ | H01L 21/67265 |

* cited by examiner

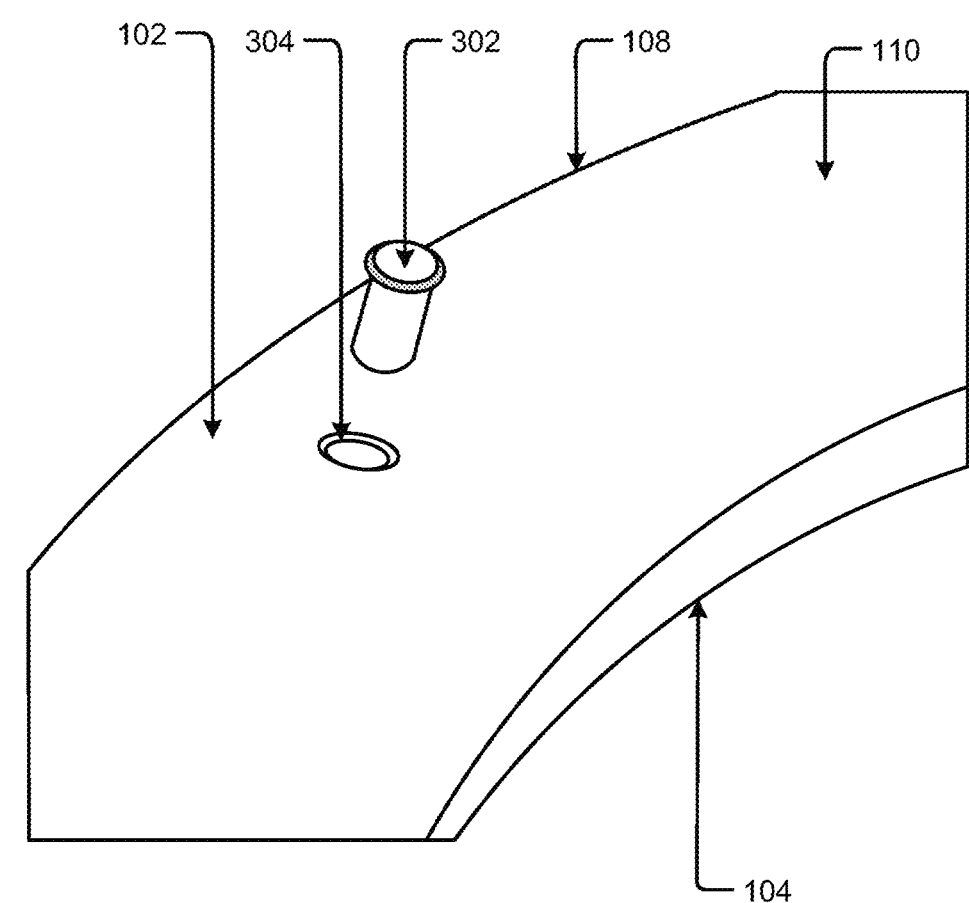
FIG. 3

500

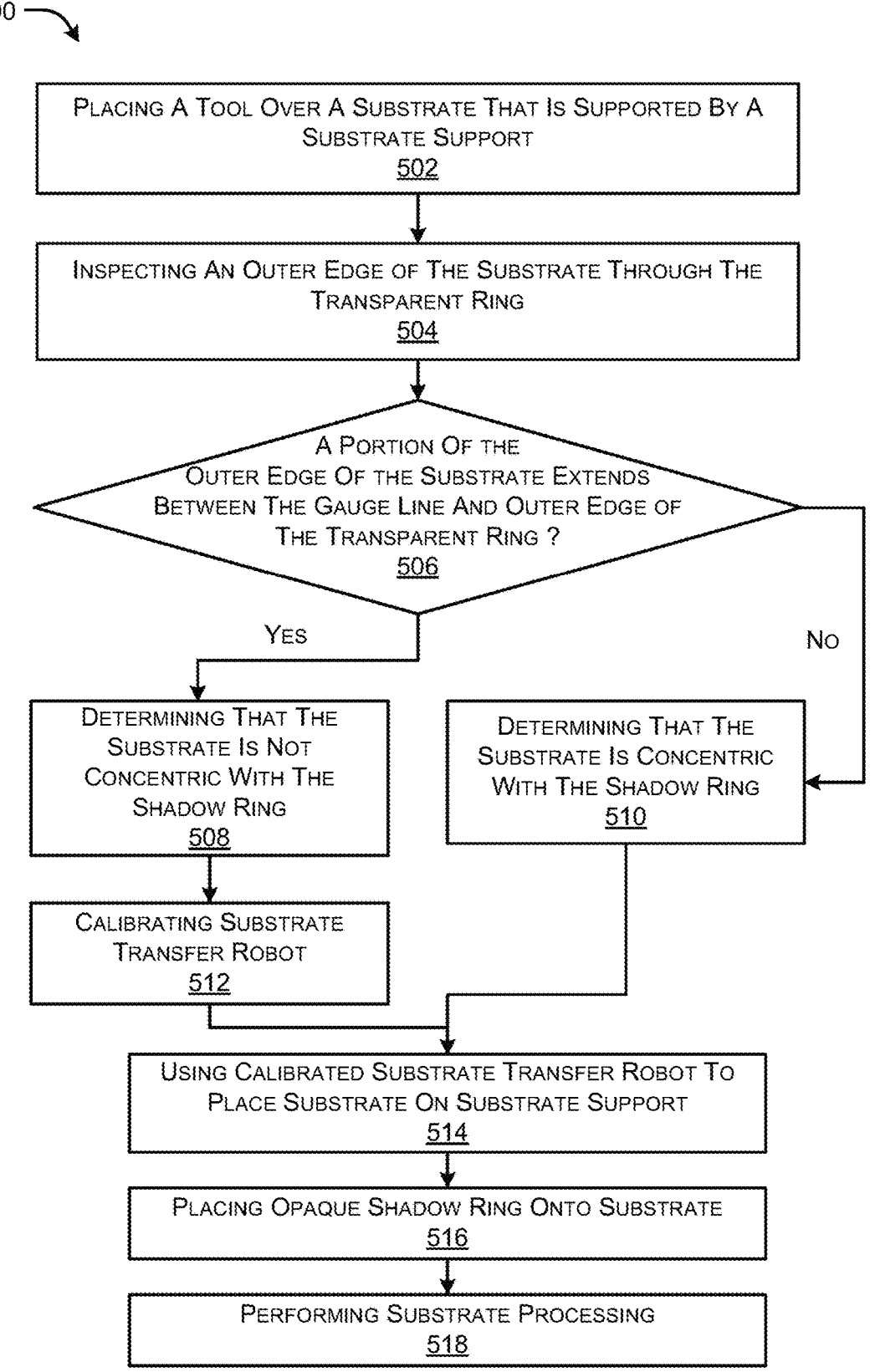

PLACING A TOOL OVER A SUBSTRATE THAT IS SUPPORTED BY A
SUBSTRATE SUPPORT
502

INSPECTING AN OUTER EDGE OF THE SUBSTRATE THROUGH THE
TRANSPARENT RING
504

A PORTION OF THE
OUTER EDGE OF THE SUBSTRATE EXTENDS
BETWEEN THE GAUGE LINE AND OUTER EDGE OF
THE TRANSPARENT RING ?
506

YES

NO

DETERMINING THAT THE
SUBSTRATE IS NOT
CONCENTRIC WITH THE
SHADOW RING
508

DETERMINING THAT THE
SUBSTRATE IS CONCENTRIC
WITH THE SHADOW RING
510

CALIBRATING SUBSTRATE
TRANSFER ROBOT
512

USING CALIBRATED SUBSTRATE TRANSFER ROBOT TO
PLACE SUBSTRATE ON SUBSTRATE SUPPORT
514

PLACING OPAQUE SHADOW RING ONTO SUBSTRATE
516

PERFORMING SUBSTRATE PROCESSING
518

FIG. 5

APPARATUS AND METHODS FOR VERIFYING ALIGNMENT BETWEEN A SHADOW RING AND A SUBSTRATE

FIELD

Embodiments of the present disclosure generally relate to substrate measurement apparatus and methods, and more particularly, to measurement apparatus and methods for verifying substrate concentricity.

BACKGROUND

During semiconductor manufacturing, layers of materials may be deposited onto and/or removed from a substrate. Processing systems typically include vacuum processing chambers in which substrates are supported on pedestals. The processing systems may use substrate transfer robots to move the substrates between processing chambers in a sequence for specific processing steps, such as deposition and etching. Processing systems typically also use substrate transfer robots to precisely place the substrates on pedestals located in processing chambers.

During some deposition processes, a shadow ring may be placed over a substrate to shield or mask an outer edge of the substrate from deposition. If the shadow ring is placed sufficiently off-center with respect to the substrate, there is a chance that the outer edge of the substrate may not be uniformly shielded. Thus, some areas of the substrate intended to receive deposition may instead be shielded, which may result in reduction in production yield.

Accordingly, the inventors have provided embodiments of methods and apparatus to improve concentricity between a substrate and a shadow ring to reduce non-uniformities in substrate processing and thereby increase yield.

SUMMARY

Methods and apparatus for verifying alignment between a shadow ring and a substrate are provided herein. In some embodiments, a tool for verifying alignment between an opaque shadow ring and a substrate, the tool comprising: a transparent ring having an inner edge defining a central opening and an outer edge and having a top side and a bottom side; a gauge mark on or in the transparent ring spaced between the inner edge and the outer edge, the gauge mark extending around the inner edge; and a pin extending from the bottom side of the transparent ring and located between the gauge mark and the outer edge.

In some embodiments, a method of calibration in a substrate processing system that uses an opaque shadow ring during substrate processing, the method comprising: placing a tool over a substrate that is supported by a substrate support of the substrate processing system, and wherein the tool comprises a transparent ring having an inner edge defining a central opening; inspecting an outer edge of the substrate through the transparent ring; and calibrating a substrate transfer robot in response to the inspection.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

FIG. 3 is a partial exploded view of a portion shown in FIG. 1.

FIG. 5 shows a method in accordance with some embodiments of the present disclosure.

Figure 1:
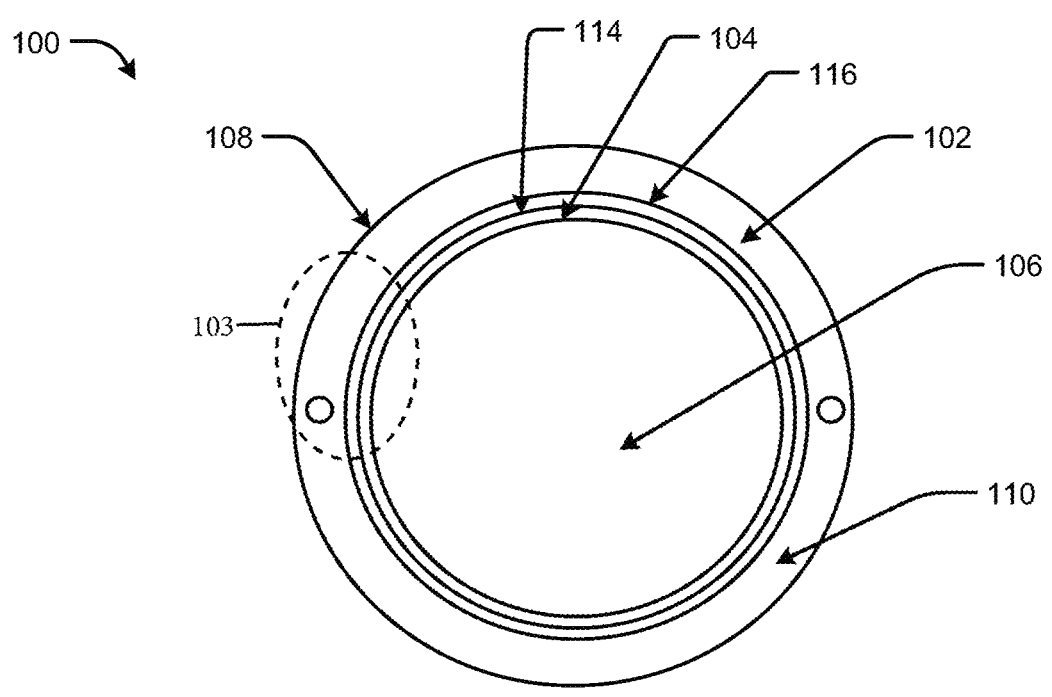
FIG. 1 is a bottom view of a tool in accordance with some embodiments of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of a methods and apparatus for verifying alignment between an opaque shadow ring and a substrate are provided herein.

Figure 2:
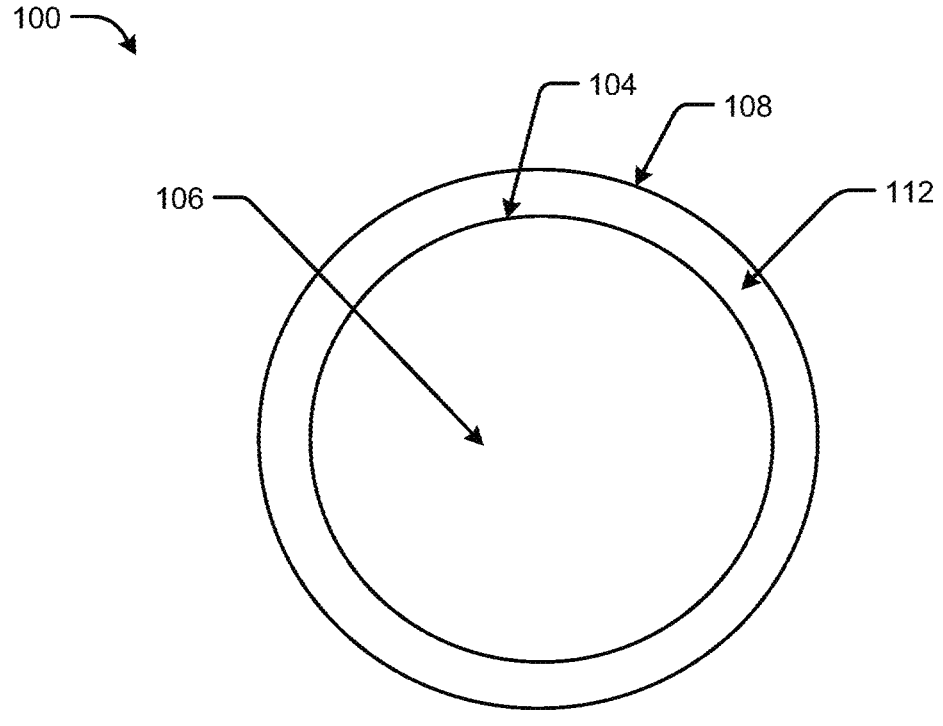
FIG. 2 is a top view of the tool shown in FIG. 1.

FIG. 1 is a bottom view of a tool 100 for verifying alignment between an opaque shadow ring and a substrate in accordance with some embodiments of the present disclosure. FIG. 2 is a top view of the tool 100 shown in FIG. 1. In some embodiments, and as shown in FIGS. 1 and 2, the tool 100 may include a transparent ring 102 having an inner edge 104 defining a central opening 106 and having an outer edge 108. The transparent ring 102 may have a top side 112 (FIG. 2) and a bottom side 110 (FIG. 1). In some embodiments, the transparent ring 102 may be fabricated from at least one of plastic, glass, or quartz. In some embodiments, the transparent ring 102 may be fabricated from polycarbonate. In some embodiments, the transparent ring 102 may have a thickness, measured between the top side 112 and the bottom side 110, of more than 3 mm. In some embodiments, a thickness of 3 mm or more may limit or prevent warping of the transparent ring 102. In some embodiments, the transparent ring 102 may be formed from a material having a coefficient of thermal expansion which allows the tool 100 to operate at temperatures of 50 C to 100 C without causing the transparent ring 102 to warp. In some embodiments, the transparent ring 102 may be formed of a material that does not outgas when at a temperature of 50 C to 100 C.

In some embodiments, and as shown in FIG. 1, the tool 100 may include a gauge mark 114 on or in the transparent ring 102. The gauge mark 114 may be spaced between the inner edge 104 and the outer edge 108, and the gauge mark 114 may extend (e.g., at least partially) around the inner edge 104. In some embodiments, the gauge mark 114 may include lines, including continuous, dotted, or broken lines. In some embodiments, the gauge mark 114 may include periodic marks. In some embodiments, and as shown in FIG. 1, the gauge mark 114 may be a line that extends continuously around the inner edge 104. In some embodiments, the gauge mark 114 may include one or more groove formed in at least one of the top side 112 or the bottom side 110. In some embodiments, and as shown in FIG. 1, the inner edge 104 may be concentric with the gauge mark 114. In some embodiments, the gauge mark 114 may be etched. In some embodiments, the gauge mark 114 may be deposited, such as by printing or painting.

In some embodiments, the gauge mark 114 and the inner edge 104 are spaced (e.g., radially) from one another by 0.4 mm to 0.6 mm. The spacing between the gauge mark 114 and the inner edge 104 may be representative of a concentricity tolerance between a shadow ring and a substrate. In some embodiments, the inner edge 104 and the outer edge 108 may have the same dimensions (e.g., diameter) as the shadow ring. In some embodiments, the inner edge 104 may have a diameter of 300 mm or less. In some embodiments, the inner edge 104 may have a diameter that is equal to an outer diameter of a substrate.

In some embodiments, the tool 100 may include a second gauge mark 116 spaced between the gauge mark 114 and the outer edge 108. In some embodiments, the second gauge mark 116 may be concentric with the gauge mark 114, and the gauge mark 114 and the second gauge mark 116 may be spaced (e.g., radially) from one another by 0.4 mm to 0.6 mm. The spacing between the gauge mark 114 and the second gauge mark 116 may be representative of a concentricity tolerance between a shadow ring and a substrate. In some embodiments, the second gauge mark 116 may be formed in the same or different manner as the gauge mark 114.

Figure 4:
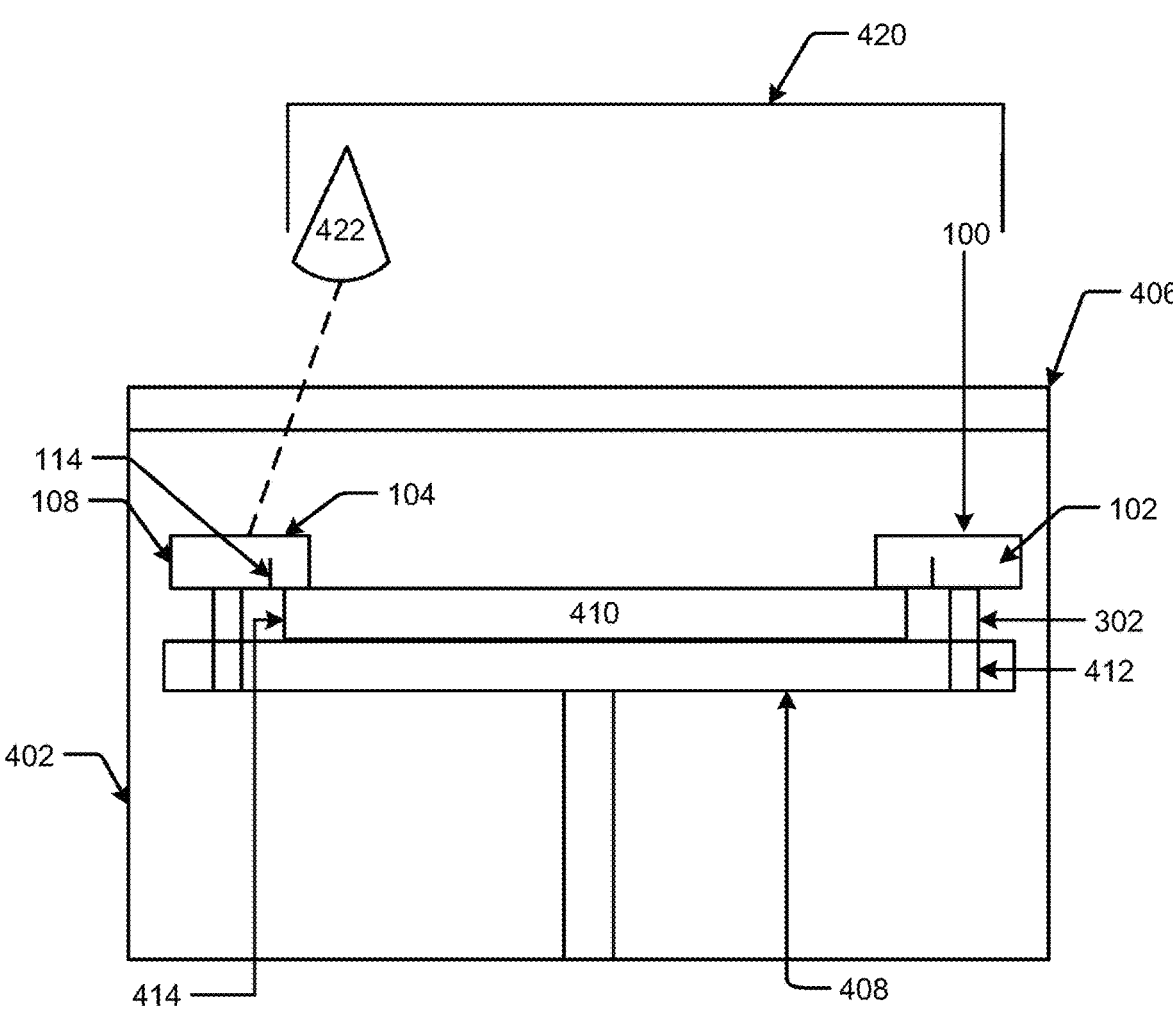
FIG. 4 is a schematic section view of a processing chamber in accordance with some embodiments of the present disclosure.

In some embodiments, and as shown most clearly in the partial exploded view of portion 103 shown in FIG. 3, the tool 100 may include a pin 302 extending from the bottom side 110 of the transparent ring 102 and located between the gauge mark 114 and the outer edge 108. In some embodiments, the transparent ring 102 may have a hole 304 that receives an end of the pin 302. The pin 302 may be secured to the transparent ring 102 using various methods, including laser welding, press fit, and adhesives. In some embodiments, the pin 302 and the transparent ring 102 may be formed as one piece (e.g., monolithic), such as, for example, by machining and/or molding. In some embodiments, and as shown in FIG. 4, the tool 100 may include a plurality of pins 302 spaced apart (e.g., circumferentially) from one another. In some embodiments, and as shown in FIG. 4, the tool 100 may include two pins 302 spaced diametrically apart.

In some embodiments, the tool 100 may be used in place of an opaque shadow ring in a processing chamber to qualify the substrate placement position for substrate processing. In some embodiments, and as shown in FIG. 4, the substrate processing chamber 400 may include a chamber body 402 defining a volume 404. In some embodiments, the chamber body 402 includes a transparent lid 406. In some embodiments, at least a portion of the transparent lid 406 may be transparent to allow viewing the volume 404 through the transparent lid 406 from outside the volume 404. The substrate processing chamber 400 may include a substrate support 408 configured to support a substrate 410. The substrate support 408 may have a heater to regulate the temperature of the substrate 410. In some embodiments, one or more pins 302 may be used to align the tool 100 with the substrate support 408. The substrate support 408 may have one or more holes 412 corresponding to one or more pins 302 of the tool 100. As shown in FIG. 4, two pins 302 are received in corresponding holes 412 in the substrate support 408. In some embodiments, the pins 302 and holes 412 may be configured to axially align the tool 100 with the substrate support 408 along axis A-A. In the example shown in FIG. 4, the tool 100 is disposed to permit a concentricity verification as described in greater detail below.

In some embodiments, the substrate 410 on the substrate support 408 may be placed on the substrate support 408 by a substrate transfer robot (e.g., substrate transfer robot 606 shown in FIG. 6) at a handoff position, which may be defined by cartesian coordinates within the plane of the substrate support 408. The handoff position may be programmed and stored in a controller (not shown) that controls motion of the substrate transfer robot. In some embodiments, and as shown in FIG. 4, when the tool 100 is axially aligned with the substrate support 408, a visual inspection may be made of an outer edge 414 of the substrate 410 through the transparent ring 102 and the transparent lid 406. In some embodiments the tool 100 may be included in a kit 420 with a magnifier 422 to facilitate visual inspection. In some embodiments, the magnifier 422 may be a loupe magnifier to increase precision of the visual inspection.

In some embodiments, a determination can be made about whether the concentricity between a shadow ring and the substrate is within a concentricity tolerance based on the location of the outer edge 414 of the substrate with respect to the gauge mark 114 and the outer edge 108 of the transparent ring 102. In some embodiments, if a portion of the outer edge 414 of the substrate 410 extends between the gauge mark 114 and the outer edge 108 of the transparent ring 102, a determination can be made that the substrate 410 is not concentric with the tool 100, and, thus, not concentric with the shadow ring which the tool 100 is intended to mimic. If no portion of outer edge 414 of the substrate 410 extends between the gauge mark 114 and the outer edge 108 of the transparent ring (as shown in FIG. 4), a determination can be made that the substrate 410 is concentric with the tool 100, and, thus, is concentric with the shadow ring which the tool 100 is intended to mimic.

If a determination is made that the substrate 410 is not concentric with the shadow ring, a calibration procedure for the substrate transfer robot may be performed whereupon stored coordinates of the handoff position may be updated with adjusted coordinates based on an offset measured between the outer edge 414 of the substrate 410 and the gauge mark 114. In some embodiments, the offset may be measured in two orthogonal directions to determine offsets to adjust cartesian coordinates of the handoff position.

FIG. 5 shows a method of calibration in a substrate processing system that uses an opaque shadow ring during substrate processing in accordance with some embodiments of the disclosure. At block 502, the method 500 may include placing a tool (e.g., tool 100) over a substrate that is supported by a substrate support (e.g., substrate support 408) of the substrate processing system. The tool may be the tool 100 described above and placing the tool may include inserting the pin 302 into a corresponding hole 412 in the substrate support 408 as shown in FIG. 4 to align the tool 100 with the substrate support 408. At block 504, the method 500 may include inspecting an outer edge 414 of the substrate 410 through the transparent ring 102 and/or the transparent lid 406. At block 506, the method 500 may include determining whether a portion of the outer edge 414 of the substrate 410 extends between the gauge mark 114 and the outer edge 108 of the transparent ring 102.

If a portion of the outer edge 414 of the substrate 410 extends between the gauge mark 114 and the outer edge 108 of the transparent ring 102 (YES at block 506), then, at block 508, the method 500 may include determining that the substrate 410 is not concentric with the shadow ring. If no portion of outer edge 414 of the substrate 410 extends between the gauge mark 114 and the outer edge 108 of the transparent ring 102 (NO at block 506), then, at block 510, the method 500 may include determining that the substrate 410 is concentric with the opaque shadow ring.

Figure 6A:
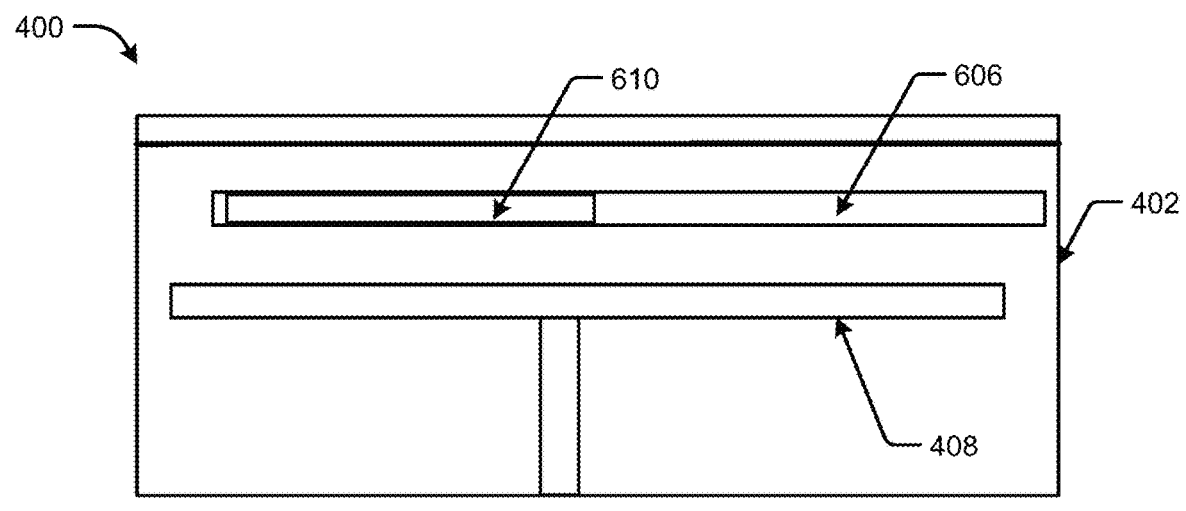
FIGS. 6A-6C show a schematic section view of a processing chamber in accordance with some embodiments of the present disclosure.

At block 512, the method 500 may include calibrating a substrate transfer robot to adjust the handoff position. In some embodiments, and as shown in FIG. 6A, a substrate transfer robot 606 may be calibrated. As noted above, in some embodiments, stored coordinates of the handoff position may be updated with adjusted coordinates based on an offset measured between the outer edge 414 of the substrate 410 and the gauge mark 114. In some embodiments, the offset may be measured in two orthogonal directions to determine offsets to adjust cartesian coordinates of the handoff position.

Figure 6B:
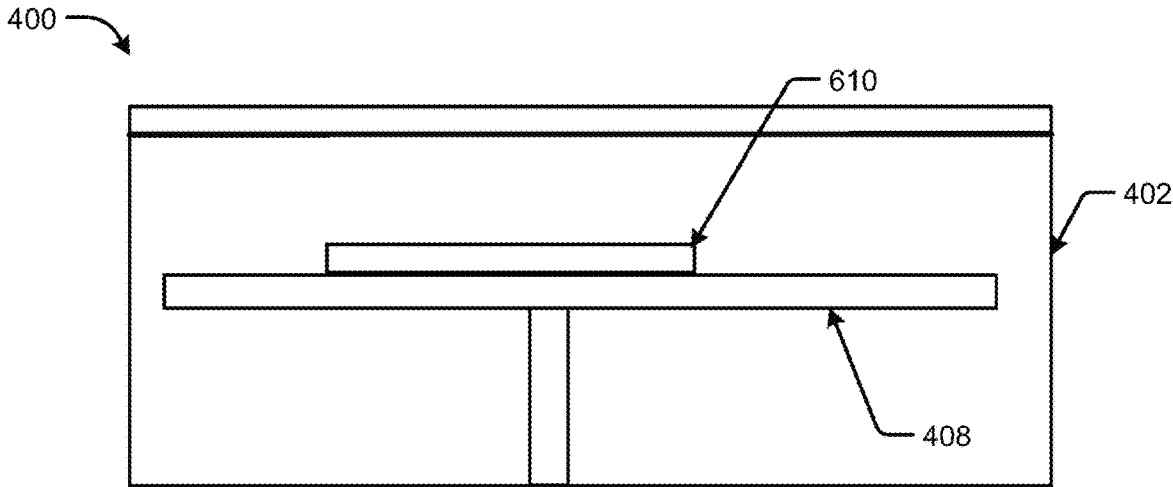

At block 514, the method 500 may include using the calibrated substrate transfer robot to place another substrate on the substrate support. In some embodiments, and as shown in FIG. 6A, the substrate transfer robot 606 may be used to place a substrate 610 onto substrate support 408. FIG. 6B shows the substrate 610 on the substrate support 408 after being placed by the calibrated substrate transfer robot 606.

Figure 6C:
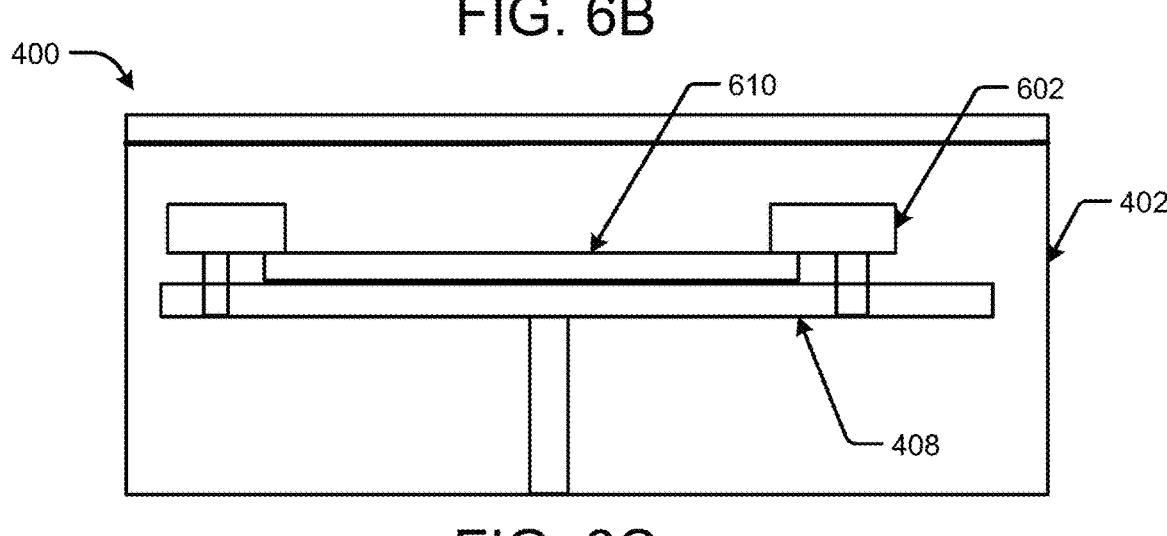

At block 516, the method 500 may include placing an opaque shadow ring onto the substrate. In some embodiments, and as shown in FIG. 6C, an opaque shadow ring 602 is placed onto the substrate 610 as well as the substrate support 408. At block 518, the method 500 may include performing substrate processing on the substrate 610 in the substrate processing chamber 400.

If the substrate is determined to be concentric with the shadow ring at block 510, then the substrate transfer robot may be calibrated and the calibration may not be updated block 512. Thus, in some embodiments, and as shown in FIG. 5, if the substrate is determined to be concentric with the shadow ring at block 510, the calibrated substrate transfer robot may be used to place another substrate on the substrate support at block 514, so that an opaque shadow ring may be placed onto the substrate at block 516, and substrate processing may be performed at block 518.

The embodiments of methods and apparatus described herein use a tool to verify concentricity between an opaque shadow ring and a substrate. The results of the verification can be used to calibrate a handoff position of a substrate transfer robot used for placing a substrate on a substrate support. By calibrating the handoff position, concentricity between the opaque shadow ring and the substrate may be improved, which may improve substrate processing yields.

While the foregoing is directed to embodiments of the present disclosure, other and further embodiments of the disclosure may be devised without departing from the basic scope thereof.

The invention claimed is:

1. A tool for verifying alignment between an opaque shadow ring and a substrate, the tool comprising:
   a transparent ring having an inner edge defining a central opening and an outer edge and having a top side and a bottom side;
   a gauge mark on or in the transparent ring spaced between the inner edge and the outer edge, the gauge mark extending around the inner edge; and
   a pin extending from the bottom side of the transparent ring and located between the gauge mark and the outer edge.

2. The tool of claim 1, wherein the transparent ring is fabricated from at least one of plastic, glass, or quartz.

3. The tool of claim 1, wherein the transparent ring is fabricated from polycarbonate.

4. The tool of claim 1, wherein the transparent ring has a thickness, measured between the top side and the bottom side, of at least 3 mm.

5. The tool of claim 1, wherein the gauge mark includes a groove formed in at least one of the top side or the bottom side.

6. The tool of claim 1, wherein the inner edge is concentric with the gauge mark.

7. The tool of claim 6, wherein the gauge mark and the inner edge are spaced from one another by 0.4 mm to 0.6 mm.

8. The tool of claim 7, wherein the inner edge has a diameter of 300 mm.

9. The tool of claim 1, further comprising a second gauge mark spaced between the gauge mark and the outer edge.

10. The tool of claim 9, wherein the second gauge mark is concentric with the gauge mark and wherein the gauge mark and the second gauge mark are spaced from one another by 0.4 mm to 0.6 mm.

11. A method of calibration in a substrate processing system that uses an opaque shadow ring during substrate processing, the method comprising:
   placing a tool over a substrate that is supported by a substrate support of the substrate processing system, and wherein the tool comprises a transparent ring having an inner edge defining a central opening;
   inspecting an outer edge of the substrate through the transparent ring; and
   calibrating a substrate transfer robot in response to the inspection.

12. The method of claim 11, wherein the transparent ring includes a gauge mark on or in the transparent ring, the gauge mark spaced between the inner edge and an outer edge of the transparent ring.

13. The method of claim 12, wherein the tool has a top side and a bottom side and the tool comprises a pin extending from the bottom side located between the gauge mark and the outer edge of the transparent ring, wherein placing the tool includes inserting the pin into a corresponding hole in the substrate support.

14. The method of claim 12, further comprising:
   if a portion of the outer edge of the substrate extends between the gauge mark and an outer edge of the transparent ring, determining that the substrate is not concentric with the opaque shadow ring; or
   if no portion of outer edge of the substrate extends between the gauge mark and the outer edge of the transparent ring, determining that the substrate is concentric with the opaque shadow ring.

15. The method of claim 14, further comprising calibrating the substrate transfer robot if it is determined that the substrate is not concentric with the opaque shadow ring.

16. The method of claim 15, further comprising using the calibrated substrate transfer robot to place another substrate on the substrate support and to place the opaque shadow ring over the substrate.

17. The method of claim 12, wherein the gauge mark includes a groove formed in at least one of a top side or a bottom side of the transparent ring.

18. The method of claim 12, wherein the inner edge is concentric with the gauge mark.

19. The method of claim 18, wherein the gauge mark and the inner edge are spaced from one another by 0.4 mm to 0.6 mm.

20. The method of claim 12, further comprising a second gauge mark spaced between the gauge mark and the outer edge, wherein the second gauge mark is concentric with the gauge mark, and wherein the gauge mark and the second gauge mark are spaced from one another by 0.4 mm to 0.6 mm.

* * * * *